(12) United States Patent
Reichert (10) Patent No.: US 12,092,904 B2
(45) Date of Patent: Sep. 17, 2024

(54) SAFETY EYEWEAR

(71) Applicant: Abraham Reichert, Modiin (IL)

(72) Inventor: Abraham Reichert, Modiin (IL)

( * ) Notice: Subject to any disclaimer, the term of this patent is extended or adjusted under 35 U.S.C. 154(b) by 1002 days.

(21) Appl. No.: 16/970,707

(22) PCT Filed: Feb. 17, 2019

(86) PCT No.: PCT/IB2019/051271
§ 371 (c)(1),
(2) Date: Aug. 18, 2020

(87) PCT Pub. No.: WO2019/159141
PCT Pub. Date: Aug. 22, 2019

(65) Prior Publication Data
US 2020/0379274 A1 Dec. 3, 2020

Related U.S. Application Data

(60) Provisional application No. 62/631,988, filed on Feb. 19, 2018.

(51) Int. Cl.
*G02C 7/02* (2006.01)
*G02B 27/01* (2006.01)
*G02C 11/00* (2006.01)

(52) U.S. Cl.
CPC .......... *G02C 7/028* (2013.01); *G02B 27/0172* (2013.01); *G02C 11/10* (2013.01); *G02B 2027/0138* (2013.01); *G02B 2027/0178* (2013.01)

(58) Field of Classification Search
USPC .................................................. 351/41, 158
See application file for complete search history.

(56) References Cited

U.S. PATENT DOCUMENTS

| 5,012,527 | A | * | 5/1991 | Michel | A61F 9/029 |
| | | | | | 2/9 |
| 5,648,832 | A | * | 7/1997 | Houston | G02C 7/02 |
| | | | | | 351/159.02 |
| 5,732,415 | A | * | 3/1998 | Boyd | A01K 13/006 |
| | | | | | 54/80.2 |
| 6,036,315 | A | * | 3/2000 | Copeland | G02C 7/02 |
| | | | | | 351/44 |
| 6,254,236 | B1 | * | 7/2001 | Fecteau | G02C 7/02 |
| | | | | | 351/41 |
| 8,061,836 | B2 | * | 11/2011 | Tabacchi | B29D 11/00009 |
| | | | | | 351/110 |

(Continued)

FOREIGN PATENT DOCUMENTS

WO          00/52515          9/2000

OTHER PUBLICATIONS

PCT Search Report and Written Opinion PCT/IB2019/051271, Jul. 12, 2019.

*Primary Examiner* — Darryl J Collins
(74) *Attorney, Agent, or Firm* — Dekel Patent Ltd; David Klein (57) ABSTRACT

Eyewear includes a lens (31) including left and right curved, concave protuberances (33) with a connecting structure (37) for sitting on a nose of a user. A peak point (63) of each protuberance (33), which is at a point of maximum distance from a user's eye, is not aligned with a centerline of the user's eye but is offset from the centerline of the user's eye by an offset distance.

10 Claims, 12 Drawing Sheets

(56) References Cited

U.S. PATENT DOCUMENTS

| | | |
|---|---|---|
| 2002/0101568 A1 | 8/2002 | Eberl |
| 2009/0296044 A1* | 12/2009 | Howell .................. G02C 5/146 351/158 |
| 2011/0051076 A1* | 3/2011 | Sugihara ................ G02C 7/086 351/158 |
| 2012/0206323 A1 | 8/2012 | Osterhout |
| 2016/0377869 A1 | 12/2016 | Lee |

* cited by examiner

SAFETY EYEWEAR

FIELD OF THE INVENTION

The present invention relates generally to eyewear, and particularly to safety goggles and lenses that protect the user's eyes from blows, projectiles, shrapnel and the like.

BACKGROUND OF THE INVENTION

Goggles, or safety glasses, are forms of protective eyewear that usually enclose or protect the area surrounding the eye in order to prevent particles, water or chemicals from striking the eyes. Goggles are often worn when using power tools, such as drills or chainsaws, to prevent flying particles from damaging the eyes. Goggles have many uses in the military and law enforcement fields, such as protecting personnel from objects, such as stones, shrapnel, ricochet and the like, during training or in war situations. In these situations, the glasses provide life-saving protection for the soldier who wears them, and therefore glasses are required to provide maximum protection for the soldier.

Goggles have at least two main components: a frame and a transparent lens. The lenses of prior art are normally a spherical segment that covers the user's eye area. However, because of their close proximity to the face, it is possible that a ricochet will hit the lens and bend it so that the eye will still be damaged even if the lens remains unbroken.

Figure 1:
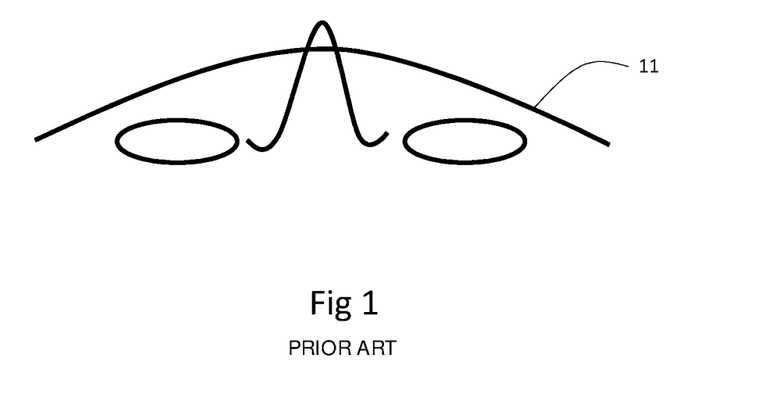
FIG. 1 is a simplified top-view illustration of a prior art goggle lens worn by a user.
Figure 2:
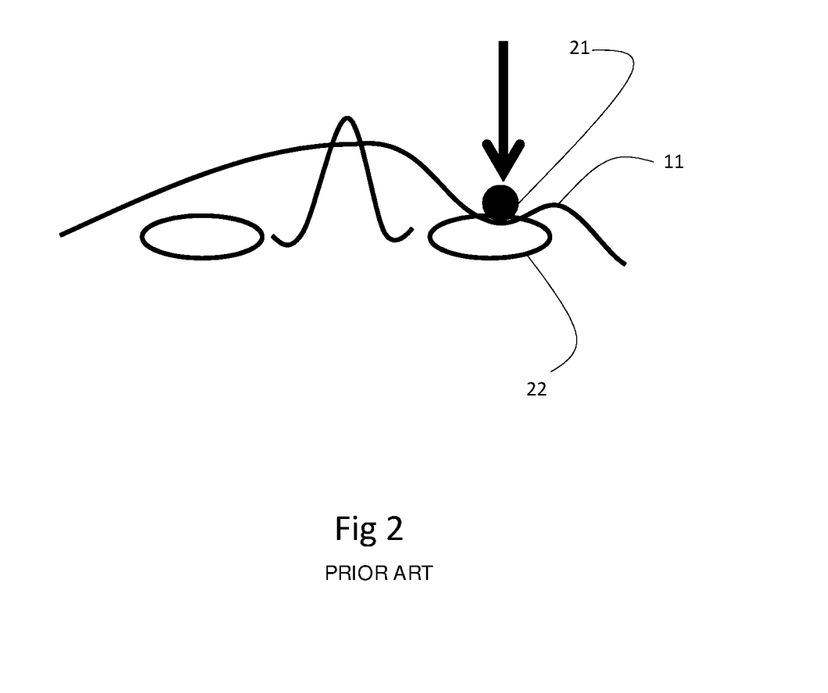
FIG. 2 is a simplified top-view illustration of the prior art goggle lens being hit by a ricochet or other striking object.

FIG. 1 illustrates a prior art goggle lens 11 worn by a user. The prior art goggle lens 11 has a curved shape that fits the face structure. FIG. 2 illustrates a ricochet or other striking particle 21 striking the lens 11. It is noted that lens 11 bends towards the eye 22 which can be critically injured.

SUMMARY OF THE INVENTION

The present invention seeks to provide improved safety eyewear, as is described more in detail further below. Unlike the prior art, in the present invention, the special structure of the lens prevents damage to the eye, while at the same time reduces weight and yet maintains strength of the lens to withstand blows.

There is provided in accordance with an embodiment of the present invention eyewear including a lens including two curved, concave protuberances with a concave connecting structure for sitting on a nose of a user, wherein a point of maximum distance from a user's eye is not aligned with a centerline of the user's eye but is offset from the centerline of the user's eye by an offset distance.

BRIEF DESCRIPTION OF THE DRAWINGS

The present invention will be understood and appreciated more fully from the following detailed description, taken in conjunction with the drawings in which:

FIG. 7 is a simplified top-view illustration of safety eyewear worn by a user, in accordance with a non-limiting embodiment of the invention, wherein the difference between FIG. 3 and FIG. 7 is that in FIG. 3 the embodiment is one continuous structure whereas in FIG. 7 there are two separate lenses (right and left), each of which have the inventive structure described for one side of FIG. 3;

DETAILED DESCRIPTION

Figure 3:
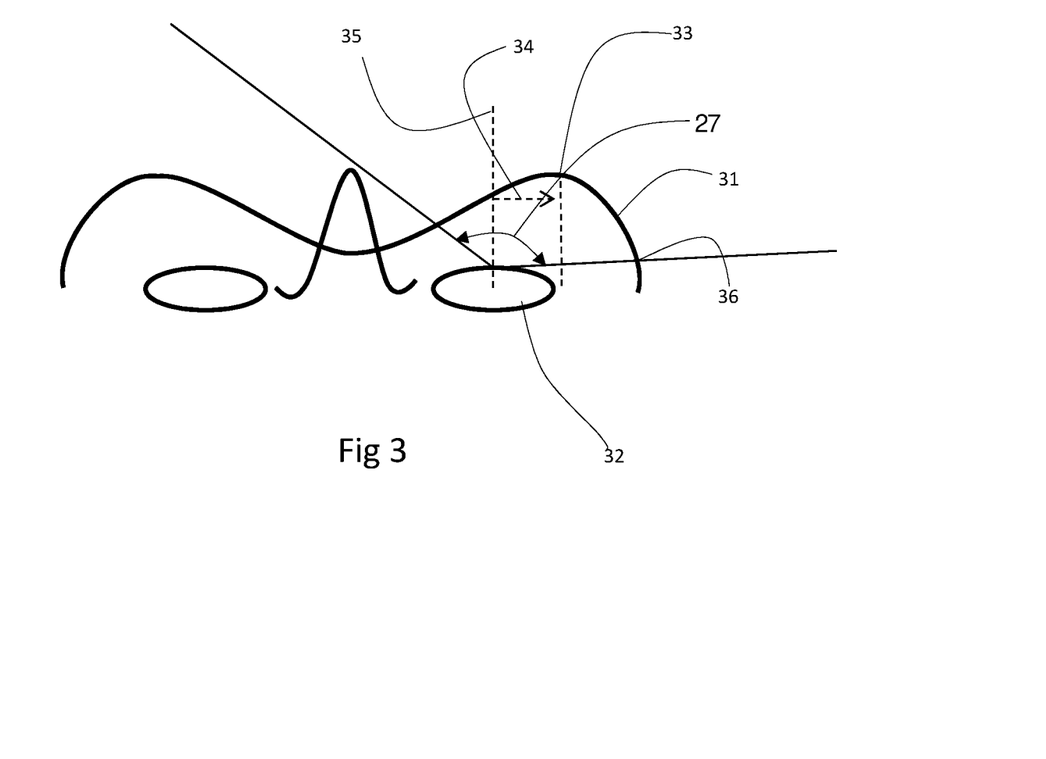
FIG. 3 is a simplified top-view illustration of safety eyewear worn by a user, in accordance with a non-limiting embodiment of the invention.
Figure 4:
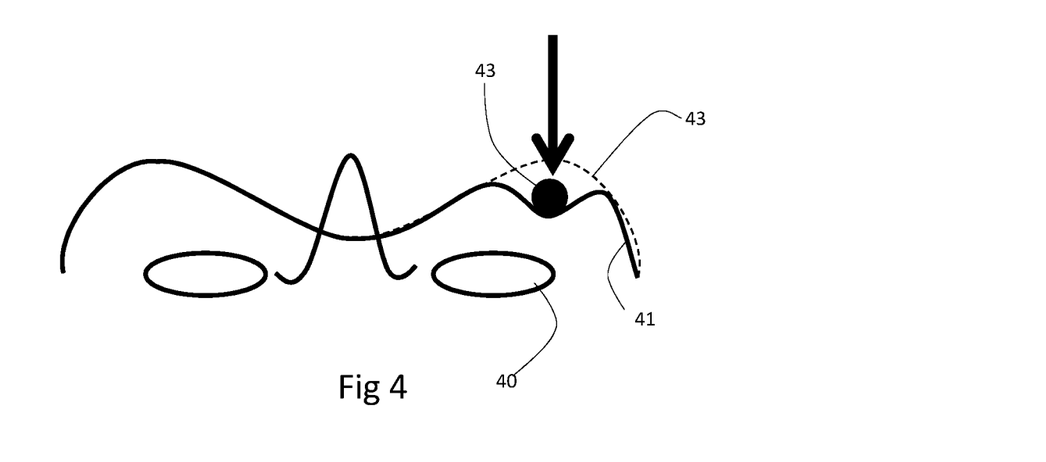
FIG. 4 is a simplified top-view illustration of the eyewear of FIG. 3 being hit by a ricochet or other striking object.
Figure 5:
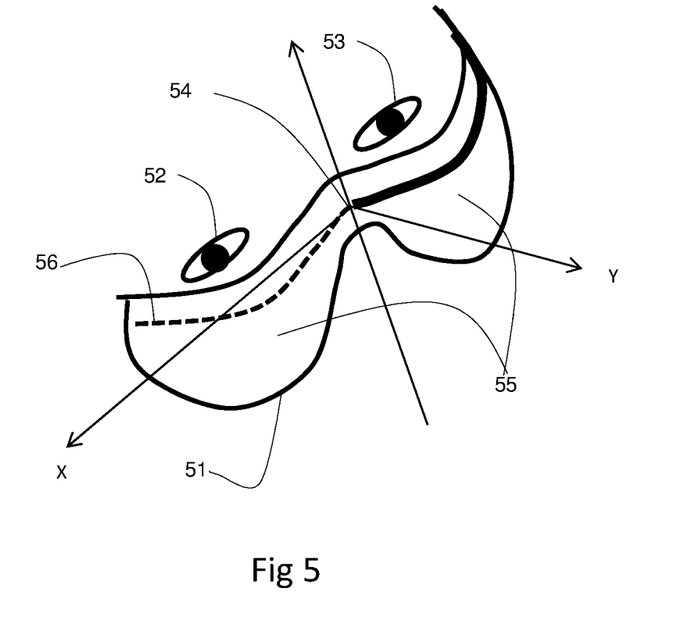
FIG. 5 is a simplified perspective illustration of the safety eyewear of FIG. 3.

Reference is now made to FIGS. 3-5, which illustrate safety eyewear 30 with a lens 31, as worn by a user, in accordance with a non-limiting embodiment of the invention. The structure of lens 31 is a curved shape with two curved, concave protuberances 33 with a (preferably curved, e.g., concave) connecting structure 37 for sitting on a bridge of the nose of the user. Unlike the prior art, the point 63 of maximum distance from the user's eye 32 (referred to as a peak point 63 of protuberance 33) is not aligned with the eye's centerline 35, but surprisingly and counterintuitively is offset from the eye's centerline 35 by an offset distance 34. The offset distance 34 may be, without limitation, in the range of 5-25 mm, such as but not necessarily 10 mm.

Each side edge 36 of lens 31 is lower than the peak point 63 of protuberances 33 in order to give the user maximum protection and maximum, free-of-disturbances peripheral field of vision 27 (that is, wrap-around, with no line in the field of vision). The structure of the eyewear 30 and lens 31 provides maximum protection against high speed ricochet as can be seen in FIG. 4. In FIG. 4, a ricochet 43 hits the lens 31 and bends it to a deformed shape 41 but does not hurt the eye 32.

Figure 6:
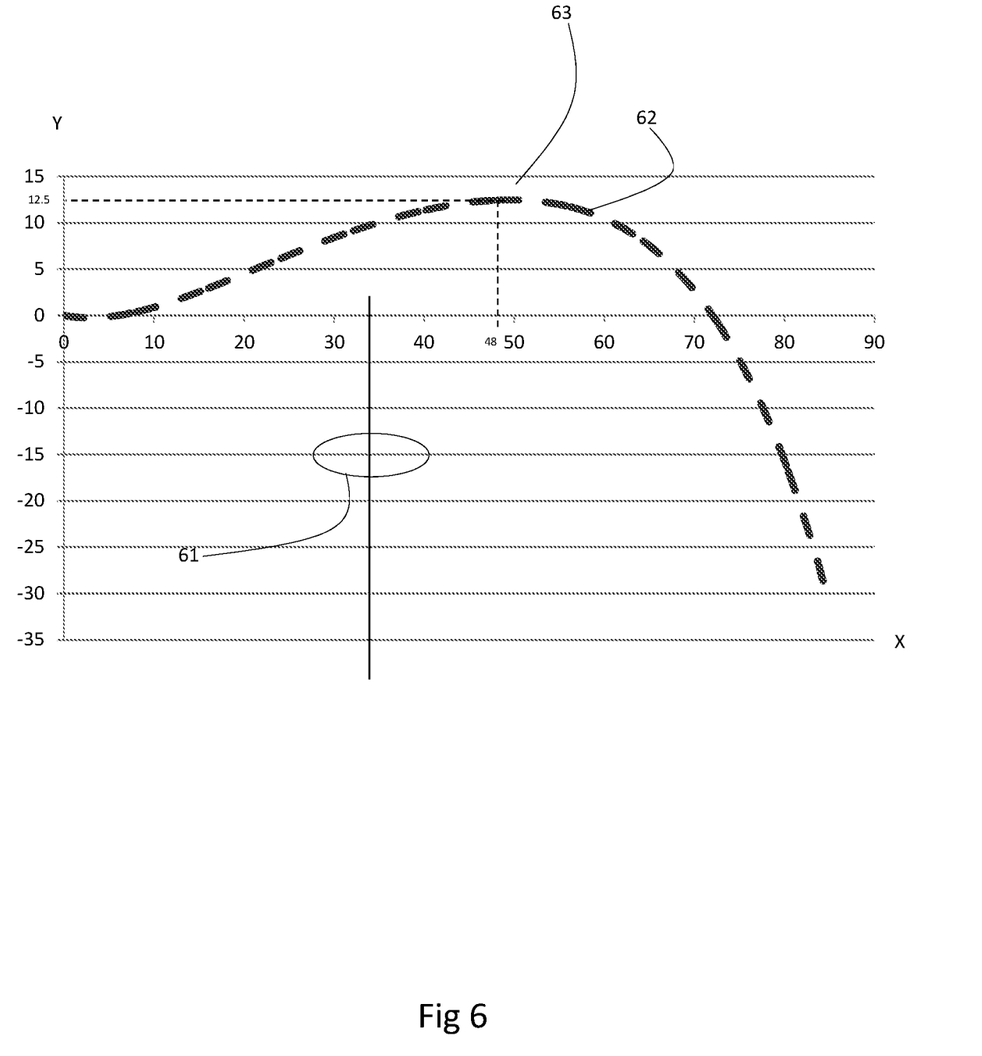
FIG. 6 is a graphical illustration of a polynomial curve that defines the shape of the lens of the eyewear of FIGS. 3 and 5.

FIG. 5 illustrates the eyewear 30 on a user with concave connecting structure 37 sitting on the nose 54 of the user. The right side cross sectional shape 56 of the lens 31 is a smooth curve which can be represented as a polynomial equation of the form $$Y = a + bX + cX^2 + dX^3 + eX^4 + fX^5$$

as shown graphically in FIG. 6. In FIG. 6, X is the horizontal axis starting at the nose and Y is the forward distance away from the user's face and nose.

The approximate polynomial for the illustrated embodiment is:

$$Y=0.3256-0.3437X+0.055X^2-0.00163X^3+2e^{-5}X^4-1e^{-7}X^5$$

The position of the eye 32 is at 32 mm on the X axis and −15 mm on the Y axis. The point 63 of maximum distance from the user's eye is, without limitation, at coordinates X=48 mm; Y=12.5 mm.

Figure 7:
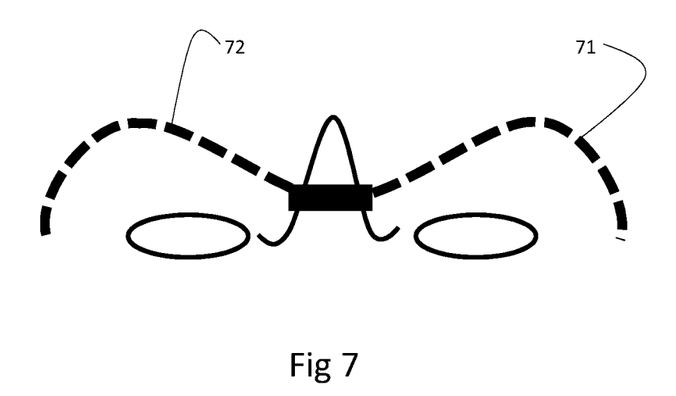
Figure 8:
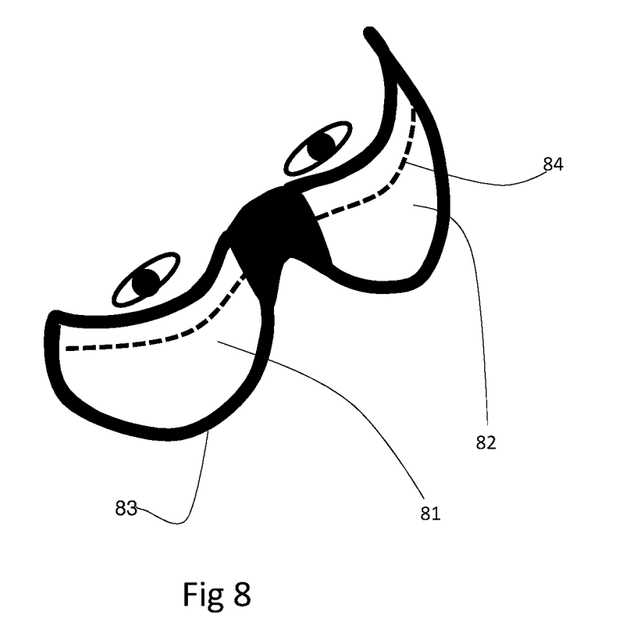
FIG. 8 is a simplified perspective illustration of the eyewear of FIG. 7.

Reference is now made to FIGS. 7 and 8, which illustrate safety eyewear 40 worn by a user, in accordance with a non-limiting embodiment of the invention. The difference between the embodiment of FIG. 3 and that of FIG. 7 is that in FIG. 3 the embodiment is one continuous structure whereas in FIG. 7 there are two separate lenses (right and left), each of which have the inventive structure described for one side of FIG. 3.

Figure 9:
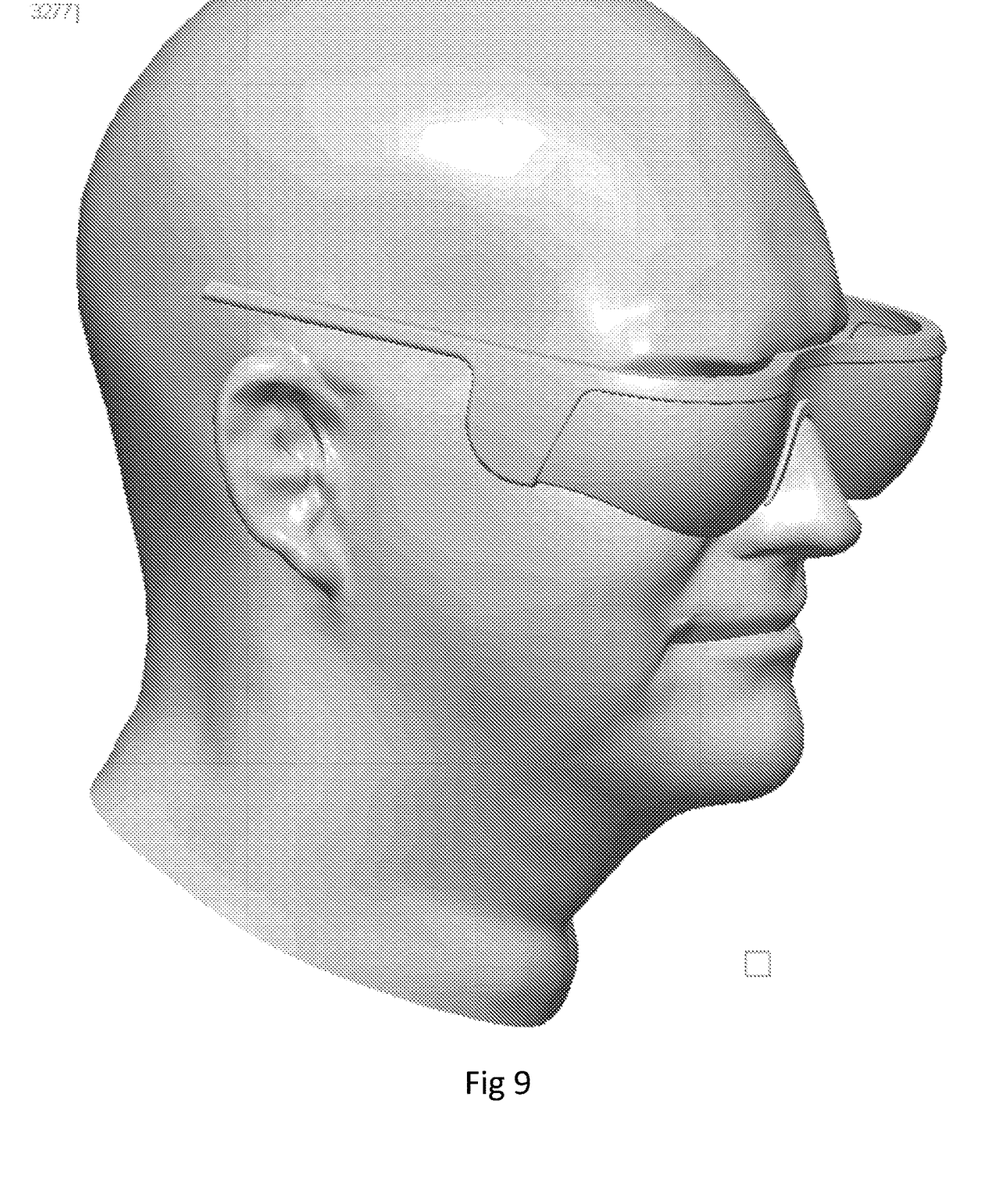
FIGS. 9, 10 and 11 are simplified perspective, top-view and front-view illustrations of a user wearing the eyewear of the embodiments of the invention.
Figure 10:
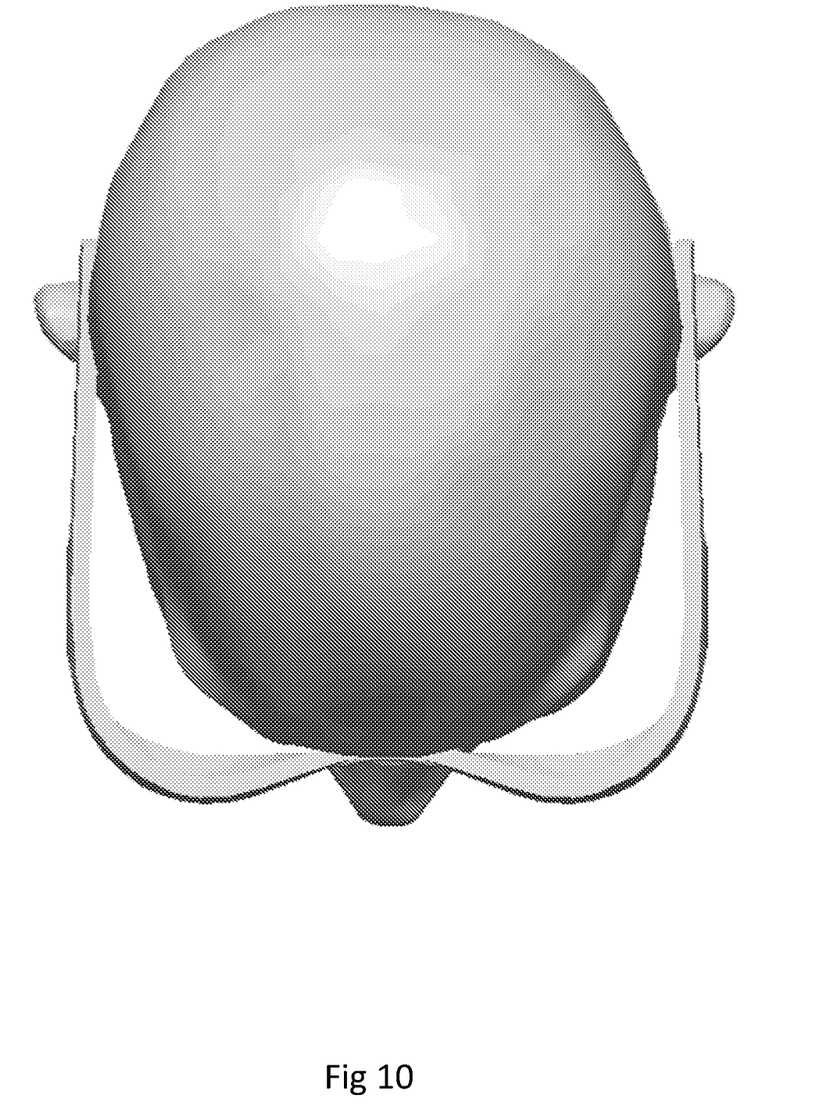
Figure 11:
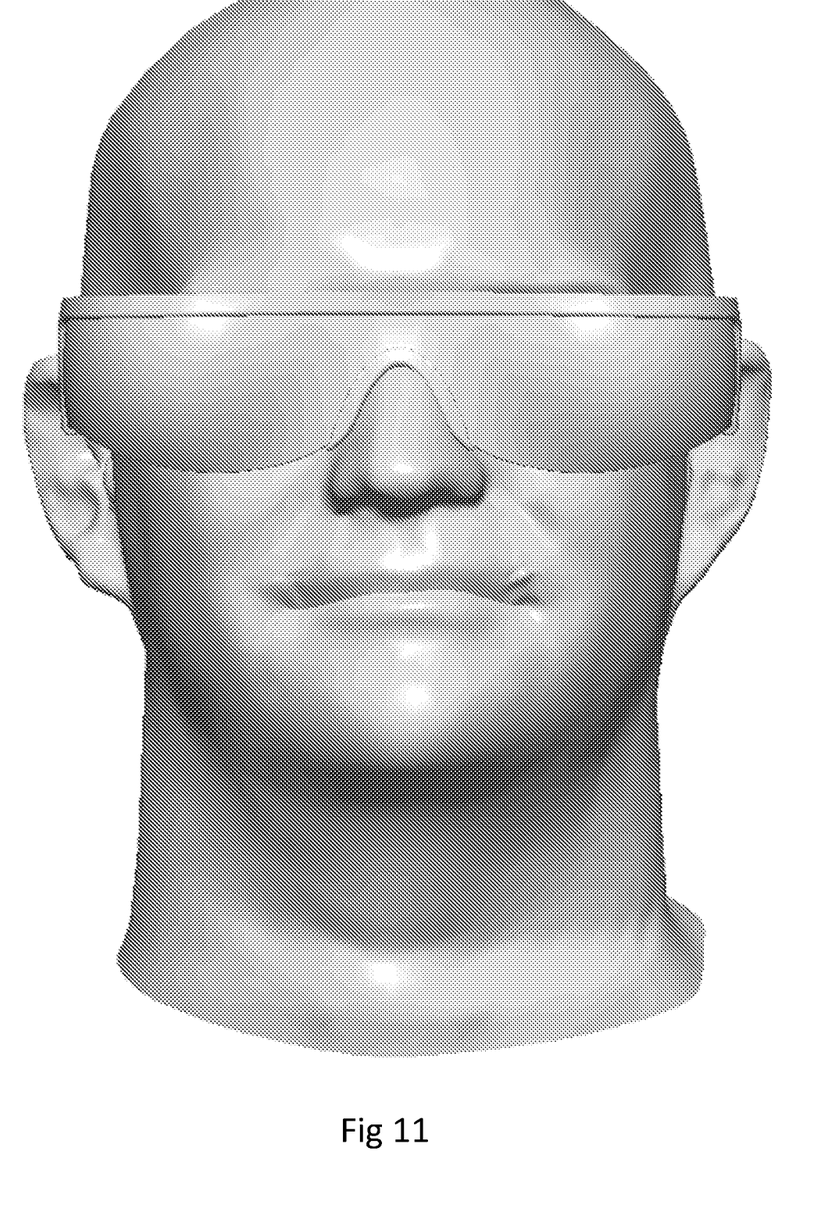

FIGS. 9, 10 and 11 illustrate a user wearing the eyewear of the embodiments of the invention.

Figure 12:
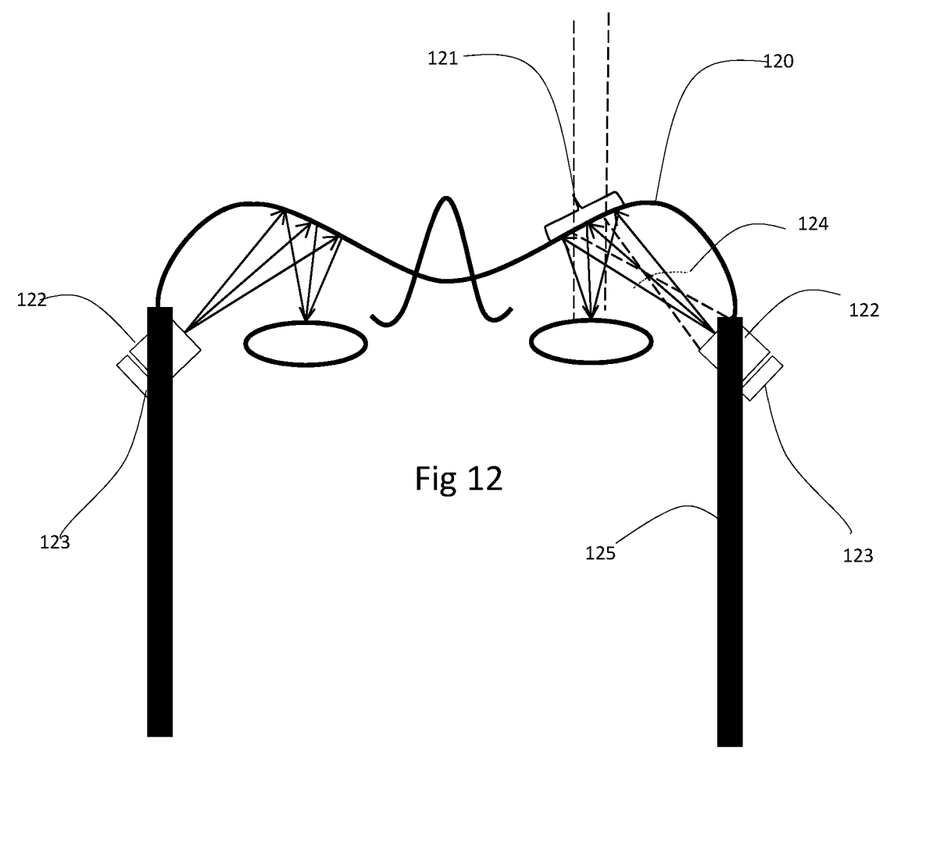
FIG. 12 is a simplified illustration of a projection optical system attached to the eye glasses frame, in accordance with an embodiment of the invention.

Reference is mow made to FIG. 12, which illustrates a projection optical system attached to the eye glasses frame 125. A display 123 is relayed by a relay lens 122 to a plane 124 between the relay lens 122 and the front lens 120. Front lens 120 is constructed like lens 31 of eyewear 30 and has a semi-reflection zone 121 to reflect the image towards the user's eye. The semi-reflection zone 121 also has some reflected optical power so that the user will able to see the image at a distance in front of the user's head while at the same time enabling the user to see the real world as it is transmitted through the semi-reflection zone 121. The same holds for left eye.

Figure 13:
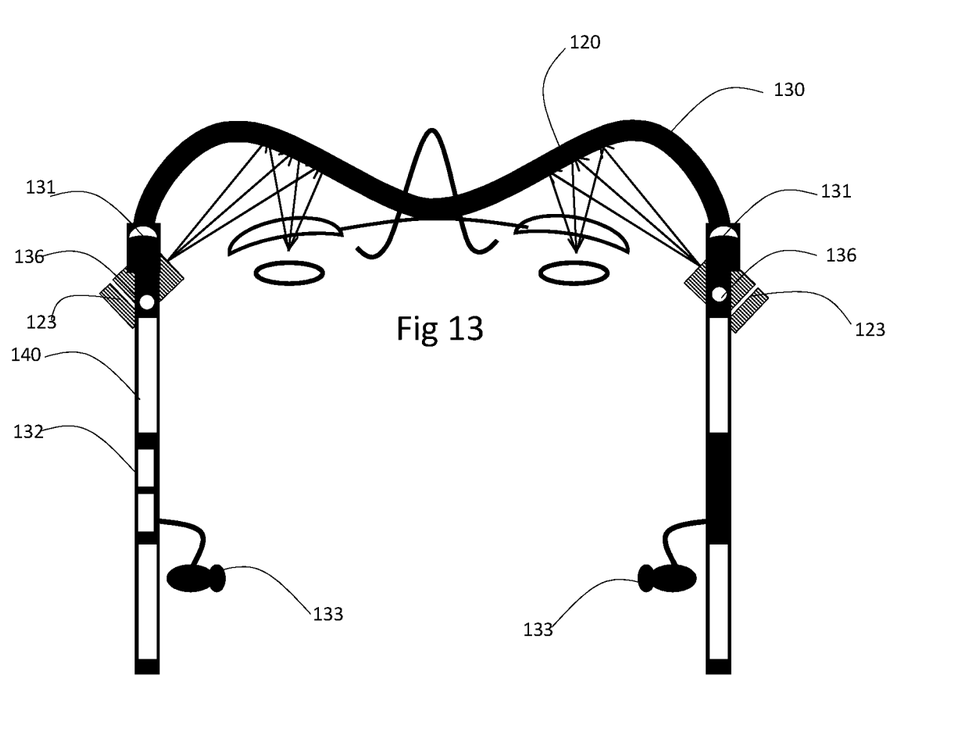
FIG. 13 is a simplified illustration of a projection optical system for all elements in the system, in accordance with an embodiment of the invention.

Reference is now made to FIG. 13, which illustrates a projection optical system having a frame 130 which is a base for all elements in the system. The front lenses 120 are attached to the frame 130, which may include an extra spectacle lens 133 for people who need it for vision correction. Also attached to the frame 130 are one or more cameras 131, which can be used for low light situations, one or more orientation sensors 132, one or more microphones 136, and one or more earphones 133. The frame 130 may also include electronics 140 to transfer data to the display 123 and to the earphones 133, and from the cameras 131 and orientation sensor 132 to a data center outside the glasses, such as a computer, cellphone or any other data center. The data between the data center and the glasses can be transferred by wired or wireless communication.

Figure 14:
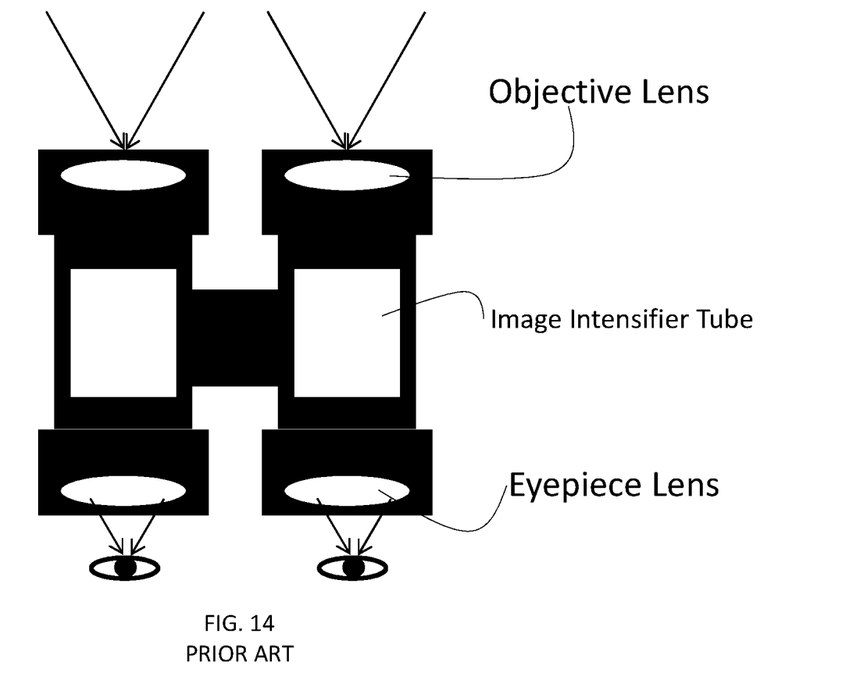
FIG. 14 is an illustration of a prior art of night vision goggles based on an image intensifier tube.
Figure 15:
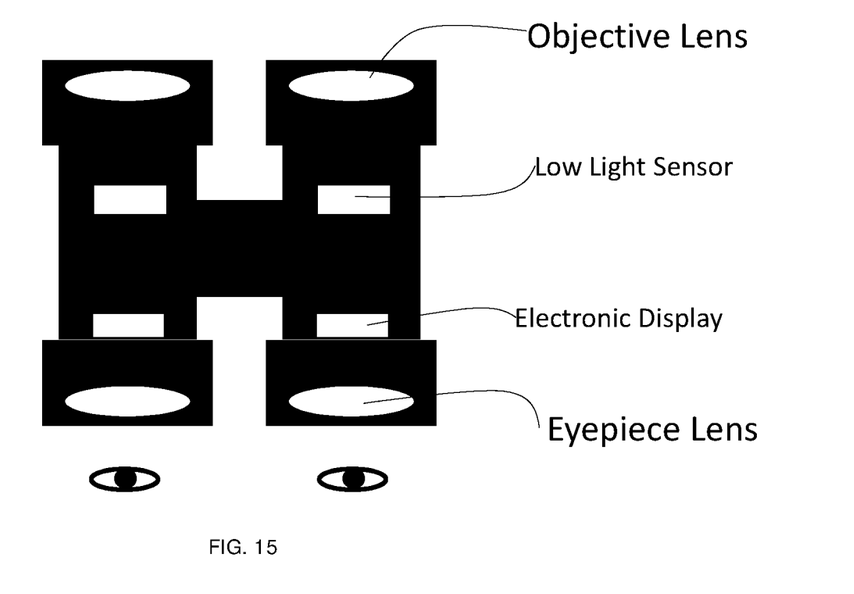
FIG. 15 is a simplified illustration of night vision goggles using a low light camera and a display, in accordance with an embodiment of the invention.

In many cases, a user who works in dark areas needs to use night vision goggles (NVG), shown in FIG. 14. Those goggles may be based on a binocular or monocular optic and may include an image intensifier tube. The NVG is heavy and cumbersome and weighs about 500-600 grams. As opposed to the prior art, as seen in FIG. 15, an embodiment of the invention may use a very sensitive electronic camera (Low Light Camera—LLC) combined with an electronic eyepiece.

Figure 16:
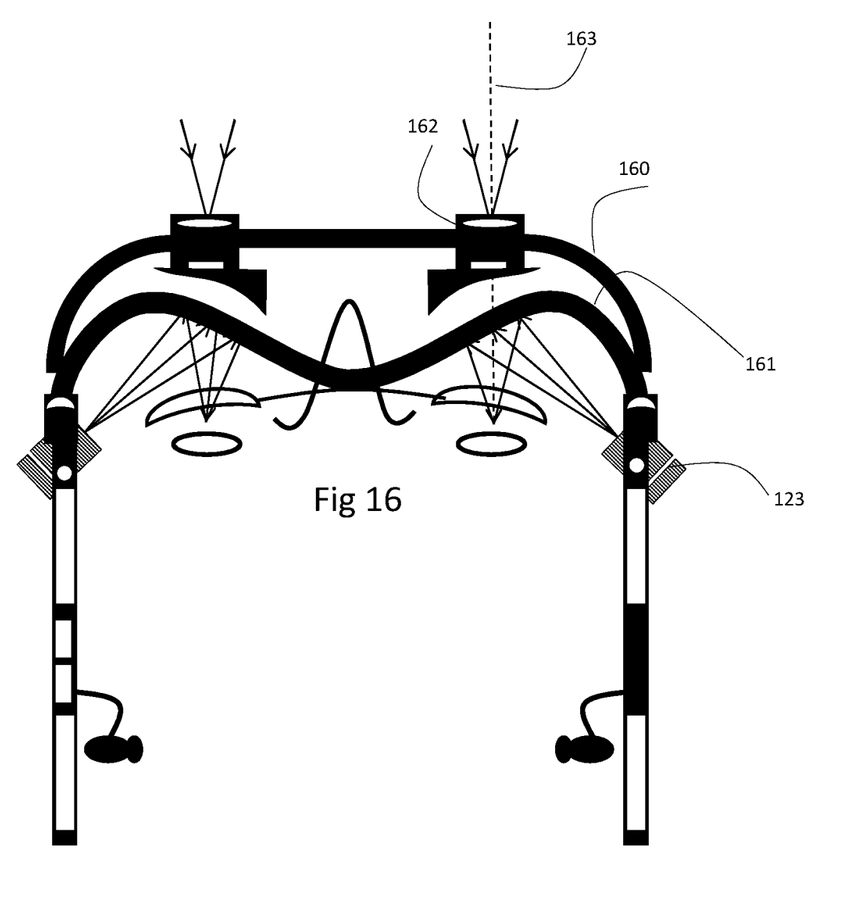
FIG. 16 is a simplified illustration of another embodiment of the invention, in which a night vision device is attached to the glasses frame.

FIG. 16 illustrates another embodiment of the invention. In this embodiment a night vision attachment 160 is placed in front of the safety glasses 161. The attachment 160 includes for each eye a low light level camera 162 which transfers its image to the display 123. To prevent parallax, the optics of the LLC 162 is placed directly on each eye's optical axis 163 and blocks the same field of view of the LLC, so that no double image of the night scene and the intensified scene will be observed.

What is claimed is:

1. Eyewear comprising:
   a lens comprising left and right curved, concave protuberances, wherein light passes unimpeded through all portions of said protuberances to eyes of a user;
   and a connecting structure for sitting on a nose of the user, and wherein an X axis is a horizontal axis starting at the nose and a Y axis is a forward distance away from the user's face and nose, and a peak point of each of said protuberances, which is at a point of maximum distance on the Y axis from a user's eye, is not aligned on the X axis with a centerline of the user's eye but is offset from the centerline of the user's eye by an offset distance on the X axis further away from the nose; and wherein a side edge of said lens is lower than said peak point and does not interfere with a field of vision of the user.

2. The eyewear according to claim 1, wherein said connecting structure forms one continuous structure with said left and right protuberances.

3. The eyewear according to claim 1, wherein said left and right protuberances are two separate lenses.

4. The eyewear according to claim 1, wherein a cross sectional shape of at least one of said left and right curved, concave protuberances is defined by a polynomial of the form $$Y=a+bX+cX^2+dX^3+eX^4+fX^5$$

and wherein $Y=0.3256-0.3437X+0.055X^2-0.00163X^3+2e^{-5}X^4-1e^{-7}X^5$.

5. The eyewear according to claim 1, comprising a low light level camera which transfers images to a display, wherein optics of said low light level camera is placed directly on each eye's optical axis and blocks same field of view of said low light level camera.

6. Eyewear comprising:
   a lens comprising left and right curved, concave protuberances, wherein light passes unimpeded through all portions of said protuberances to eyes of a user;
   and a connecting structure for sitting on a nose of the user, and wherein an X axis is a horizontal axis starting at the nose and a Y axis is a forward distance away from the user's face and nose, and a peak point of each of said protuberances, which is at a point of maximum distance on the Y axis from a user's eye, is not aligned on the X axis with a centerline of the user's eye but is offset from the centerline of the user's eye by an offset distance on the X axis further away from the nose, and further comprising a display which is relayed by a relay lens to a plane between said relay lens and one of said left and right curved, concave protuberances of said lens.

7. The eyewear according to claim 6, wherein the one of said lenses comprises a semi-reflection zone to reflect an image towards the user's eye.

8. The eyewear according to claim 7, wherein said semi-reflection zone has some reflected optical power so that the user's eye sees the image at a distance in front of the user's head while at the same time enabling the user to see real world transmitted through said semi-reflection zone.

9. The eyewear according to claim 6, wherein the one of said lenses is coupled to a frame, and coupled to said frame are one or more cameras, one or more orientation sensors, one or more microphones, and one or more earphones.

10. The eyewear according to claim 9, wherein said frame comprises data-transferring electronics.

\* \* \* \* \*